(12) United States Patent
Herron

(10) Patent No.: US 10,033,120 B2
(45) Date of Patent: Jul. 24, 2018

(54) GROUNDING ASSEMBLIES FOR LARGE CONDUCTIVE PIPES AND GROUND CLAMPS FOR SUCH ASSEMBLIES

(71) Applicant: Hubbell Incorporated, Shelton, CT (US)

(72) Inventor: Lee Scott Herron, Fairhope, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/258,088

(22) Filed: Sep. 7, 2016

(65) Prior Publication Data

US 2017/0069976 A1   Mar. 9, 2017

Related U.S. Application Data

(60) Provisional application No. 62/216,063, filed on Sep. 9, 2015.

(51) Int. Cl.
| | | |
|---|---|---|
| *H01R 4/64* | (2006.01) | |
| *F16L 1/11* | (2006.01) | |
| *F16L 1/20* | (2006.01) | |
| *H01R 4/26* | (2006.01) | |
| *H01R 4/40* | (2006.01) | |
| *H01R 13/648* | (2006.01) | |

(52) U.S. Cl.
CPC ............... *H01R 4/643* (2013.01); *F16L 1/11* (2013.01); *F16L 1/20* (2013.01); *H01R 4/26* (2013.01); *H01R 4/40* (2013.01); *H01R 13/648* (2013.01)

(58) Field of Classification Search
CPC ........ H01R 4/643; H01R 13/648; H01R 4/26; H01R 4/40; F16L 1/11; F16L 1/20

USPC .......................................................... 439/100
See application file for complete search history.

(56) References Cited

U.S. PATENT DOCUMENTS

| | | | | | |
|---|---|---|---|---|---|
| 1,830,947 | A | * | 11/1931 | Klingel ................... | H01R 4/60 174/40 CC |
| 1,887,193 | A | * | 11/1932 | Buchanan ............... | H01R 4/60 439/208 |
| 1,977,426 | A | * | 10/1934 | Bondeson ............... | H01R 4/40 439/777 |
| 2,116,474 | A | * | 5/1938 | Bondeson .............. | H01R 4/366 439/208 |
| 2,416,063 | A | * | 2/1947 | Palmer ................... | F16L 3/1233 174/40 CC |

(Continued)

OTHER PUBLICATIONS

Burndy Catalog, Substation—Aluminum Bolted Terminal I 230kV, 1 page.

*Primary Examiner* — Harshad C Patel
(74) *Attorney, Agent, or Firm* — Ohlandt, Greeley, Ruggiero and Perle, LLP

(57) ABSTRACT

A temporary grounding assembly is provided that includes a ground clamp, a tensioning member, a tensioner device, a first conductor, and a ground rod. The ground clamp has a main body with a plurality of teeth that are configured to make electrical connection with an outer diameter of a pipe. The tensioning member is secured to one end of the ground clamp. The tensioner device is securable to the tensioning member and to an opposite end of the ground clamp. The first conductor is in electrical connection with the ground clamp. The ground rod is in electrical connection with the first conductor.

15 Claims, 11 Drawing Sheets

(56) References Cited

U.S. PATENT DOCUMENTS

| | | | | |
|---|---|---|---|---|
| 2,476,980 A | * | 7/1949 | Hoffman | F16L 3/08 269/270 |
| 2,533,897 A | * | 12/1950 | Reddock | H01R 4/46 439/804 |
| 3,228,714 A | * | 1/1966 | Dricken | F16L 21/005 285/236 |
| 3,892,455 A | * | 7/1975 | Sotolongo | H01R 4/44 439/100 |
| 3,985,411 A | * | 10/1976 | Mooney | H01R 4/643 439/100 |
| 4,159,859 A | * | 7/1979 | Shemtov | H01R 4/64 439/100 |
| 4,623,204 A | | 11/1986 | Auclair | |
| 5,006,074 A | * | 4/1991 | Franks, Jr. | B23K 37/0435 439/433 |
| 5,164,545 A | | 11/1992 | Kreinberg et al. | |
| 5,281,761 A | * | 1/1994 | Woo | H01R 4/643 174/78 |
| 5,314,343 A | * | 5/1994 | Englander | H01R 4/643 24/278 |
| 5,616,036 A | * | 4/1997 | Polidori | H01R 4/60 248/74.1 |
| 5,876,224 A | * | 3/1999 | Chadbourne | H01R 25/142 439/110 |
| 6,398,596 B1 | * | 6/2002 | Malin | H01R 4/42 174/78 |
| 7,621,763 B2 | * | 11/2009 | Clark | H01R 4/36 439/100 |
| 7,780,461 B1 | * | 8/2010 | Vernica | H01R 4/36 439/100 |
| 7,845,952 B2 | * | 12/2010 | Gall | H01R 13/6205 439/100 |
| 8,317,526 B2 | * | 11/2012 | Gardner | H01R 4/36 24/489 |
| 2004/0226734 A1 | * | 11/2004 | Franks, Jr. | H01R 4/643 174/51 |
| 2005/0155782 A1 | * | 7/2005 | Westberry | H05K 13/0408 174/51 |
| 2005/0191883 A1 | * | 9/2005 | Woodward | H01R 43/16 439/115 |
| 2010/0218992 A1 | * | 9/2010 | Smith | F16L 25/01 174/84 R |
| 2014/0167763 A1 | * | 6/2014 | Giraldi | H01R 4/643 324/326 |

* cited by examiner

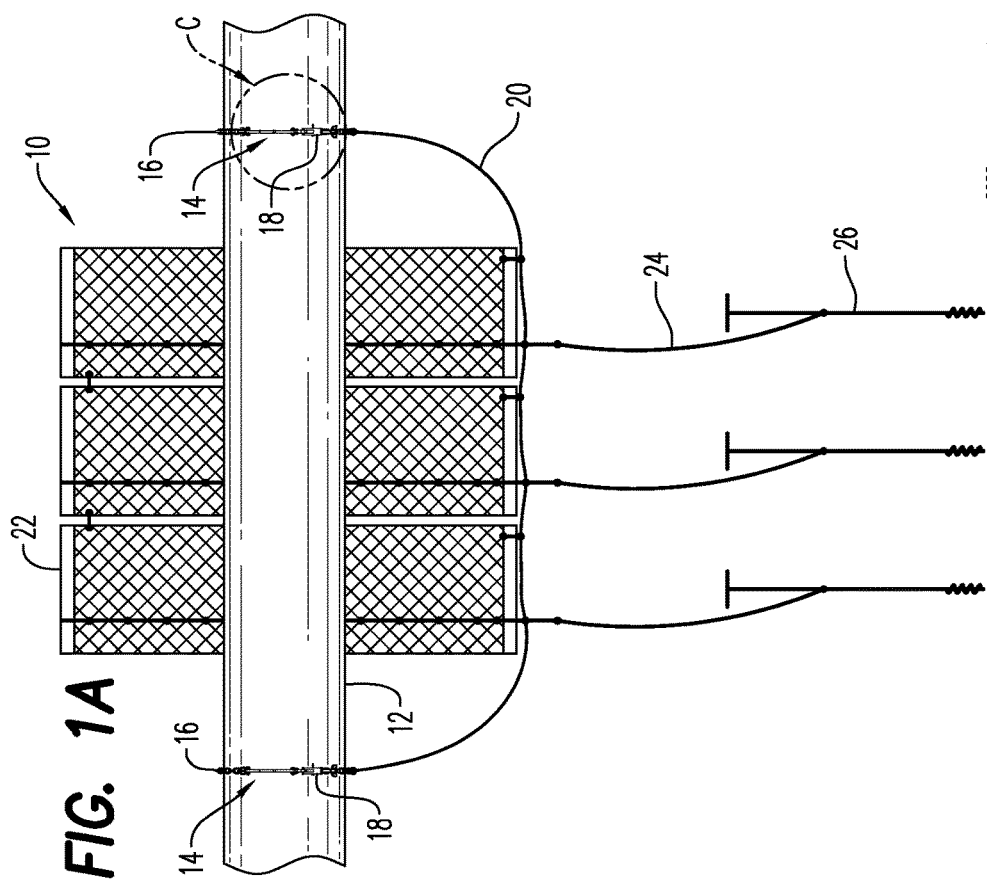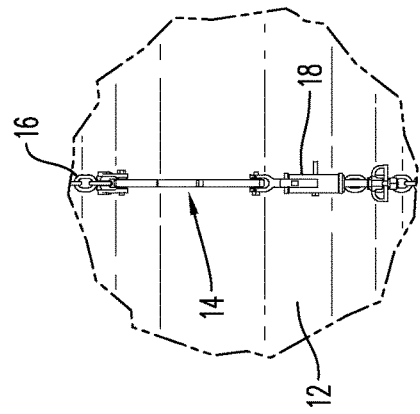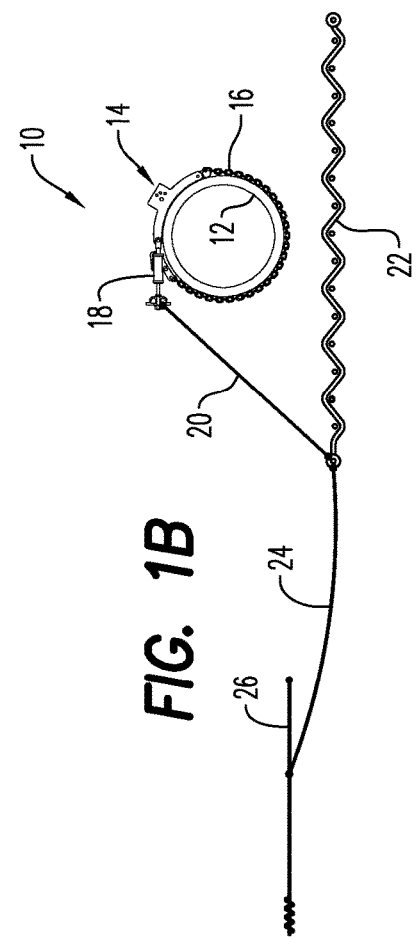

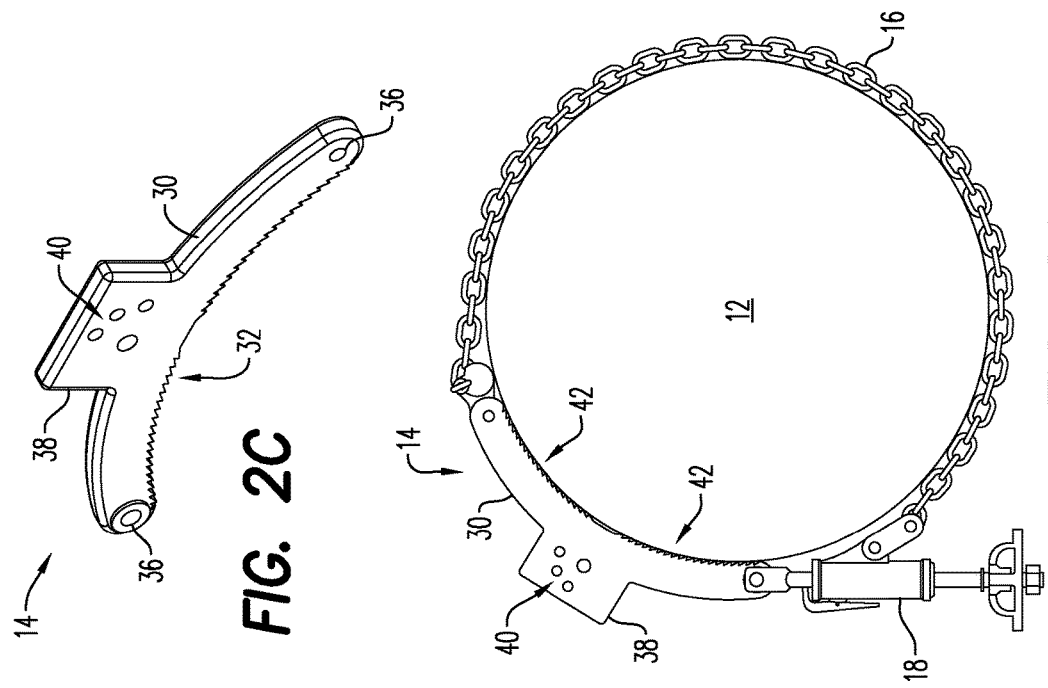
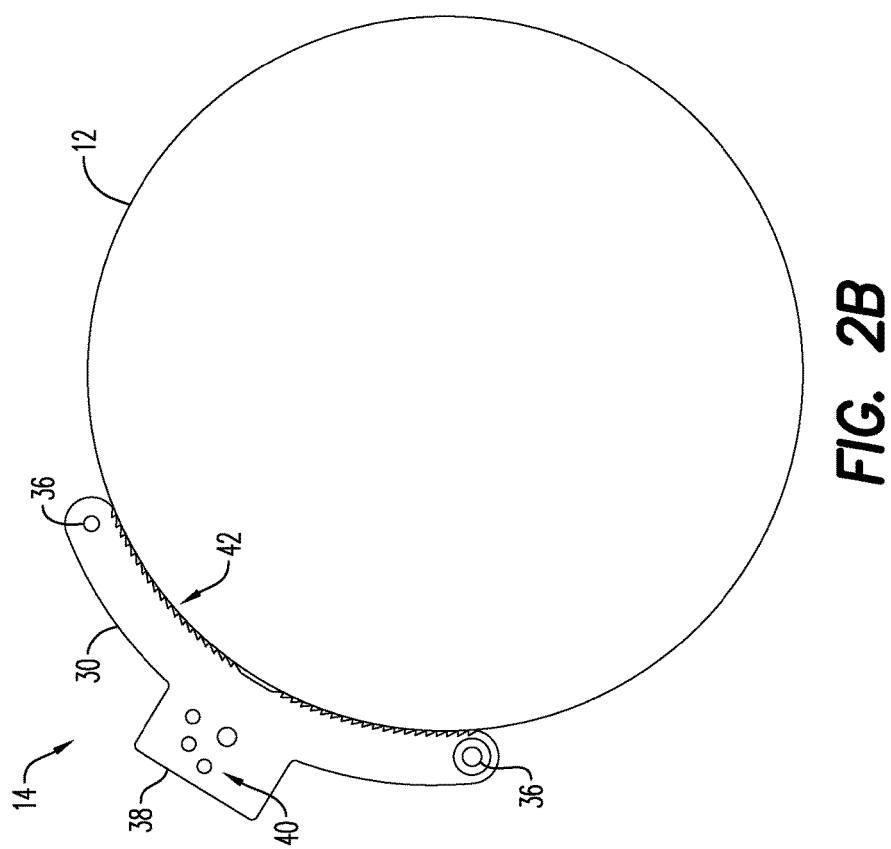

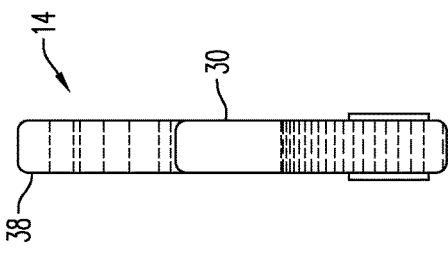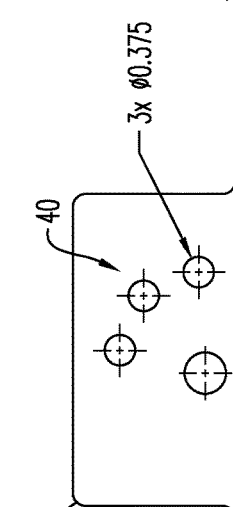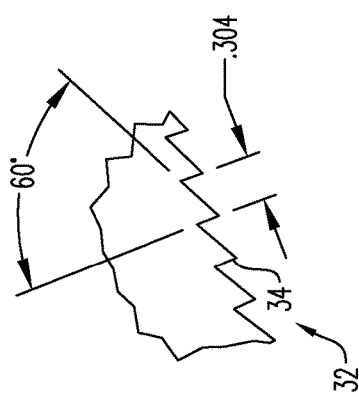

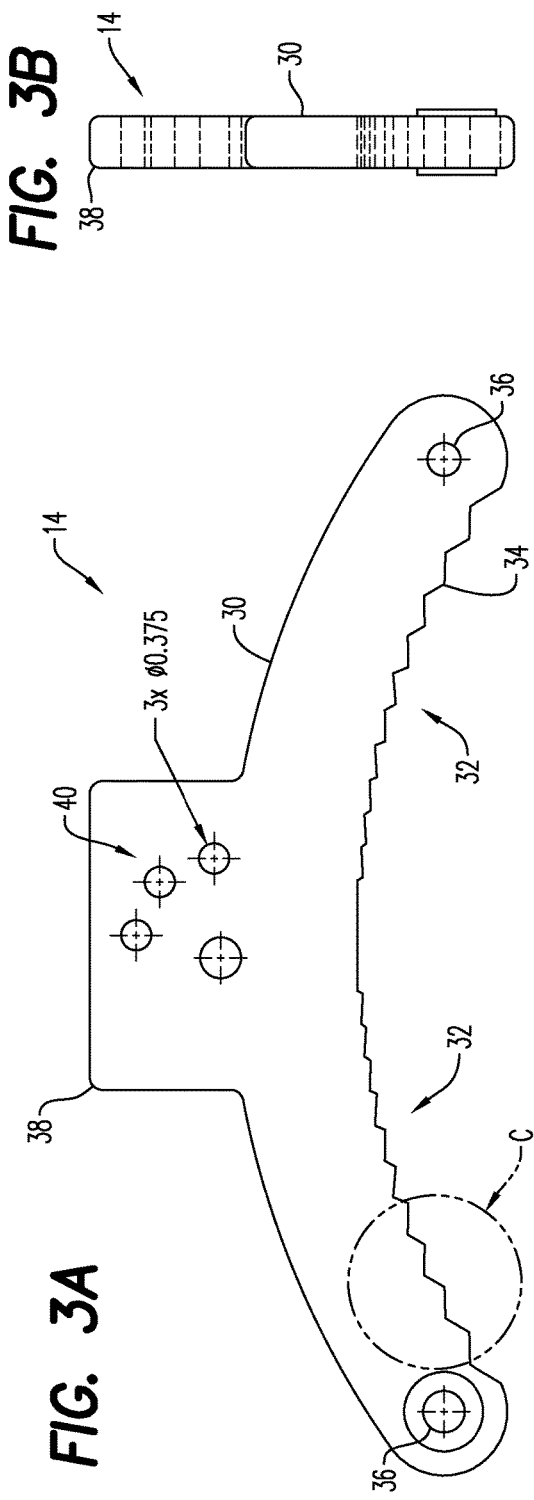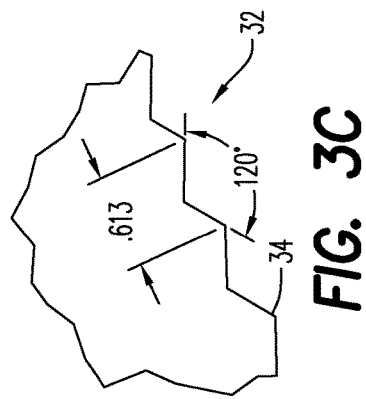
FIG. 3A
FIG. 3B
FIG. 3C

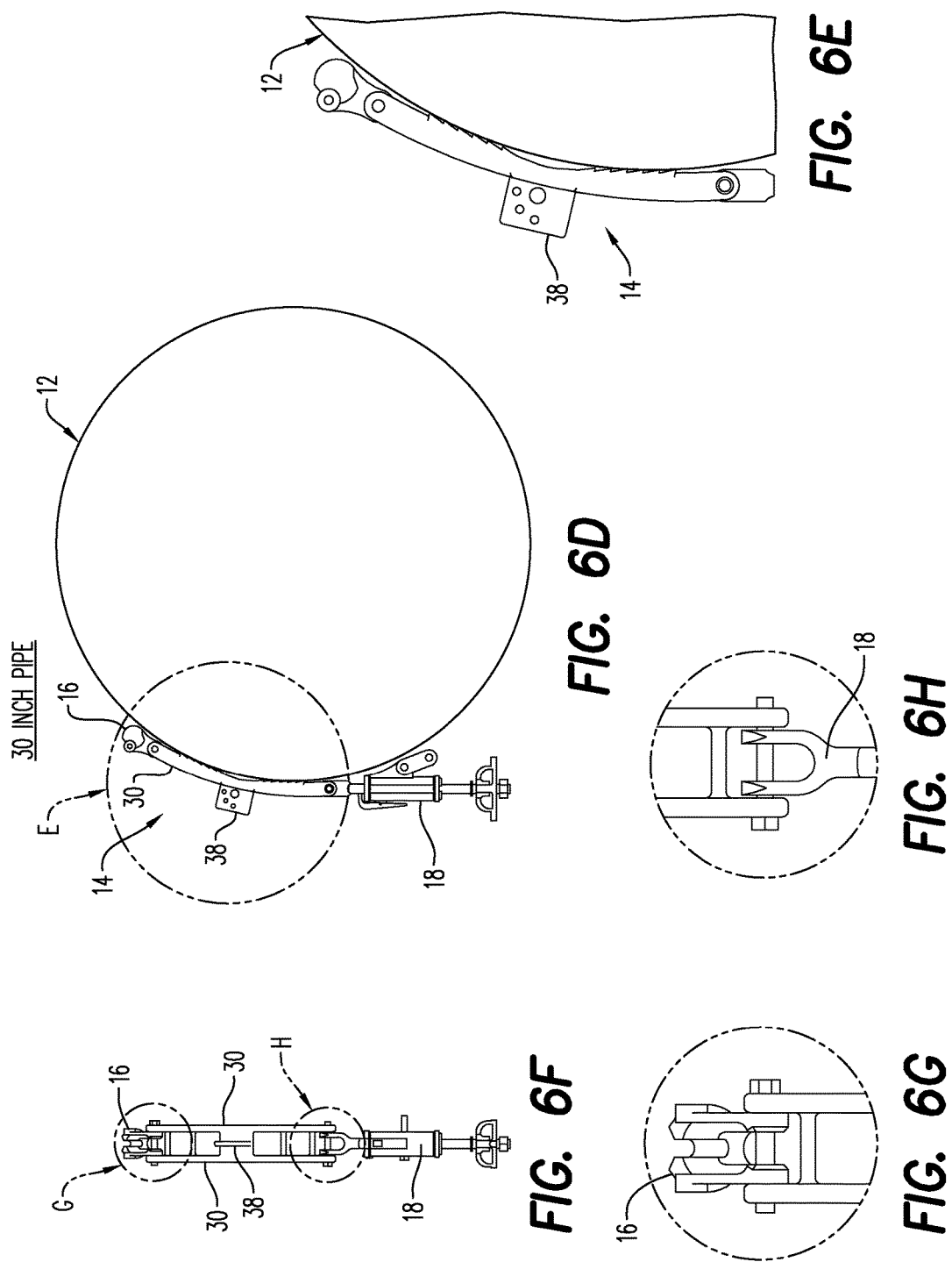

GROUNDING ASSEMBLIES FOR LARGE CONDUCTIVE PIPES AND GROUND CLAMPS FOR SUCH ASSEMBLIES

DESCRIPTION OF RELATED ART

This application claims the benefit of U.S. Provisional Application Ser. No. 62/216,063 filed Sep. 9, 2015, the contents of which are incorporated by reference herein

BACKGROUND OF THE INVENTION

1. Field of the Invention

The present disclosure is related to grounding assemblies for large conductive pipes and ground clamps for such assemblies.

2. Description of Related Art

Pipes or pipelines ("pipes") are commonly used to transport gas, oil, water, sewage, drainage, steam, and other materials varying distances. Depending on the desired usage, it is common for these pipes to have large diameters such as those ranging from about 10 inches to about 150 inches.

The large pipes are commonly made of electrically conductive materials such as, but not limited to, steel, cast iron, and others. Due to the conductive materials, electrical current can be induced into the large pipes even when these pipes are not electrically connected to a power source. The induction of current can occur from power lines that are positioned proximate to the large pipes, from geomagnetic sources, and others inductive sources.

Unfortunately, the induced current in such large pipes can make maintenance or repairs difficult. Thus, it has been determined by the present disclosure that there is a desire to easily dissipate the induced current in large conductive pipes, while performing maintenance or repairs, as well as during normal operation of the pipe. Accordingly, the present disclosure provides ground clamps and grounding assemblies for large conductive pipes.

SUMMARY

In some embodiments, a temporary grounding assembly is provided. The temporary grounding assembly includes a ground clamp, a tensioning member, a tensioner device, a first conductor, and a ground rod. The ground clamp has a main body with a plurality of teeth that are configured to make electrical connection with an outer diameter of a pipe. The tensioning member is secured to one end of the ground clamp. The tensioner device is securable to the tensioning member and to an opposite end of the ground clamp. The first conductor is in electrical connection with the ground clamp. The ground rod is in electrical connection with the first conductor.

In some embodiments either alone or in combination with the aforementioned and/or aft mentioned embodiments, the assembly can further include a grounding mat and a second conductor. The first electrical conductor is in electrical connection with the ground rod through the grounding mat and the second conductor.

In some embodiments either alone or in combination with the aforementioned and/or aft mentioned embodiments, the plurality of teeth can define a contact surface that has a diameter that conforms to the outer diameter of a single pipe.

In some embodiments either alone or in combination with the aforementioned and/or aft mentioned embodiments, the plurality of teeth can define at least two contact surfaces that each match an outer diameter of a different sized pipe.

In some embodiments either alone or in combination with the aforementioned and/or aft mentioned embodiments, the plurality of teeth can be disposed on the main body so that a leading edge of the teeth have an orientation selected from the group consisting of facing away from one another, facing towards one another, perpendicular to a radius of the pipe, and any combinations thereof.

In some embodiments either alone or in combination with the aforementioned and/or aft mentioned embodiments, the main body can include two halves and the plurality of teeth are disposed on the main body so that the plurality of teeth on each half have a leading edge that faces outward away from one another.

In some embodiments either alone or in combination with the aforementioned and/or aft mentioned embodiments, the main body can include a terminal plate and wherein the first conductor comprises a grounding lug. The grounding lug and terminal plate physically and electrically connecting the main body and first conductor to one another.

In some embodiments either alone or in combination with the aforementioned and/or aft mentioned embodiments, the grounding lug is a two-hole lug and the terminal plate has a bolt pattern that is releasably connectable to the two-hole lug in a position selected from the group consisting of parallel, 45 degrees, and 90 degrees.

In some embodiments either alone or in combination with the aforementioned and/or aft mentioned embodiments, the tensioning member can be selected from the group consisting of a cable, a chain, a strap, a wire, and any combinations thereof.

In some embodiments either alone or in combination with the aforementioned and/or aft mentioned embodiments, the tensioner device can be selected from the group consisting of a manual winch, manual ratchet, motorized winch, and a motorized ratchet.

In some embodiments either alone or in combination with the aforementioned and/or aft mentioned embodiments, the main body can be made of plate or cast metal selected from the group consisting of pure copper, brass, bronze, and any alloys thereof.

In some embodiments either alone or in combination with the aforementioned and/or aft mentioned embodiments, the main body can have a ratio of overall length (L) to the outer diameter of the pipe ranging from 1:50 to 2:1.

In some embodiments either alone or in combination with the aforementioned and/or aft mentioned embodiments, the ground clamp can include two main bodies secured to one another.

In some embodiments either alone or in combination with the aforementioned and/or aft mentioned embodiments, the two main bodies can have the teeth with a common orientation or a different orientation.

In other embodiments, a ground clamp for large pipes is provided that includes a main body having a plurality of teeth and a terminal plate. The teeth define at least one contact surface that matches an outer diameter of at least one large pipe.

In some embodiments either alone or in combination with the aforementioned and/or aft mentioned embodiments, the plurality of teeth can define at least two contact surfaces that match the outer diameter of a different sized large pipe.

In some embodiments either alone or in combination with the aforementioned and/or aft mentioned embodiments, the plurality of teeth can be disposed on the main body so that a leading edge of the teeth have an orientation selected from the group consisting of facing away from one another, facing towards one another, perpendicular to a radius of the pipe, and any combinations thereof.

In some embodiments either alone or in combination with the aforementioned and/or aft mentioned embodiments, the main body can have two halves and the plurality of teeth are disposed on the main body so that the plurality of teeth on each half have a leading edge that faces outward away from one another.

In some embodiments either alone or in combination with the aforementioned and/or aft mentioned embodiments, the ground clamp can include two main bodies secured to one another.

In some embodiments either alone or in combination with the aforementioned and/or aft mentioned embodiments, the two main bodies can include teeth that have a common orientation or a different orientation.

DESCRIPTION OF THE DRAWINGS

FIG. 1A is a top view of an exemplary embodiment of a grounding assembly in use with a large pipe;

FIG. 1B is an end view of the grounding assembly of FIG. 1A;

FIG. 1C is an enlarged side view of the grounding assembly of FIG. 1A;

FIG. 2A is an enlarged end view of the grounding assembly of FIG. 1A;

FIG. 2B is an enlarged end view of a ground clamp of the assembly in FIG. 2A;

FIG. 2C is a perspective view of the ground clamp of FIG. 2B;

FIG. 2D is a side view of the ground clamp of FIG. 2A;

FIG. 2E is an end view of the ground clamp of FIG. 2A;

FIG. 2F is a detail view of the ground clamp of FIG. 2D taken at circle F;

FIG. 3A is a side view of another exemplary embodiment of a ground clamp according to the present disclosure;

FIG. 3B is an end view of the ground clamp of FIG. 3A;

FIG. 3C is a detail view of the ground clamp of FIG. 3A taken at circle C;

FIG. 6D is a side view of the ground clamp of FIG. 6A in use with a grounding assembly;

FIG. 6E is a detail view of the grounding assembly of FIG. 6D taken at circle E;

FIG. 6F is a side view of the grounding assembly of FIG. 6D;

FIG. 6G is detail view of the grounding assembly of FIG. 6F taken at circle G; and FIG. 6H is detail view of the grounding assembly of FIG. 6F taken at circle G.

DETAILED DESCRIPTION

Figure 4A:
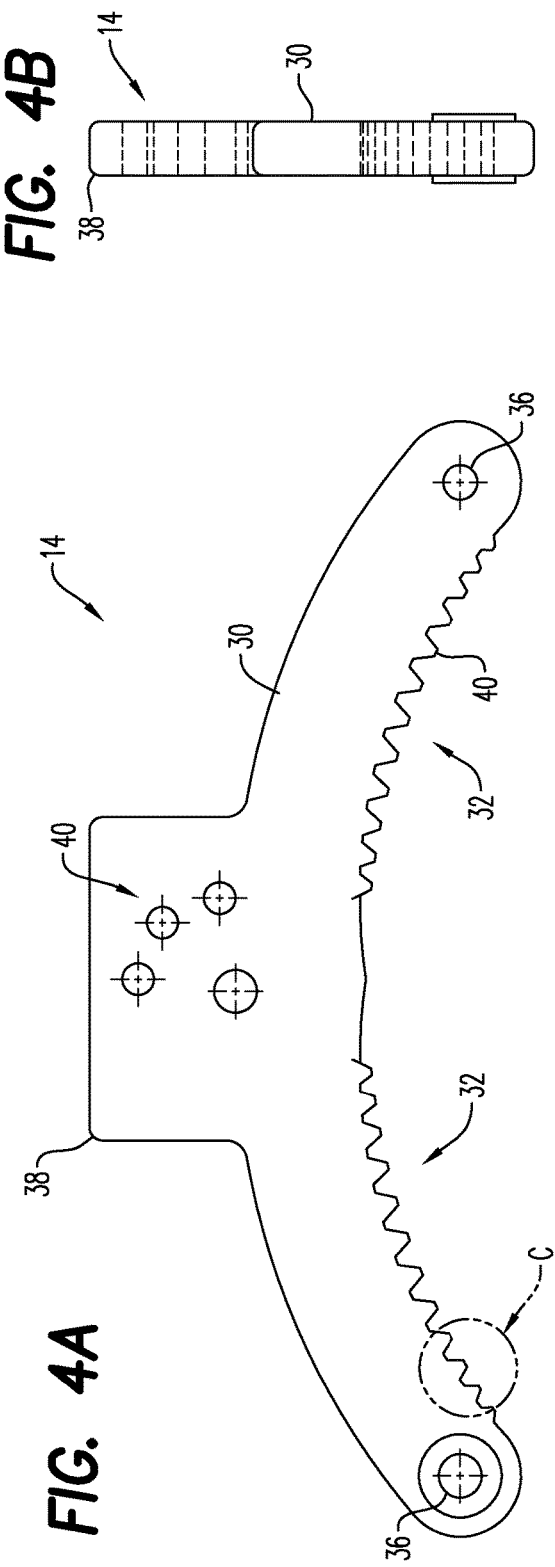
FIG. 4A is a side view of yet another exemplary embodiment of a ground clamp according to the present disclosure.

Referring to the drawings and in particular to FIGS. 1A through 1C, an exemplary embodiment of a grounding assembly is shown and is generally referred to by reference numeral 10. Assembly 10 is configured to place a pipe 12 in electrical connection with ground. In this manner, assembly 10 can advantageously eliminate or at least mitigate current induced in pipe 12 and provide equipotential voltage for grounding mats and the pipe.

Assembly 10 is illustrated as including a ground clamp 14, a tensioning member 16, a tensioner device 18, a first conductor 20, a grounding mat 22, a second conductor 24, and a grounding rod 26. Of course, it is contemplated for assembly 10 to include—in a basic embodiment—clamp 14, tensioning member 16, tensioner device 18, first conductor 20, and grounding rod 26.

Ground clamp 14, tensioning member 16, and tensioner device 18 are operatively connected to one another and positioned around pipe 12. Device 18 is then tightened so that tensioning member 16 constricts clamp 14 onto pipe 12 until the clamp is in electrical connection with the pipe. Tensioning member 16 can be any tension member capable of withstanding the desired tension induced in assembly 10 by tensioner device 18 such as, but not limited to, cables, chains, straps, wires, and others. Tensioner device 18 can be any device sufficient of inducing the desired tension in assembly 10 such as, but not limited to, manual (i.e., hand operated) or automatic (i.e., motorized) winches, ratchets, and others.

First conductor 20 places ground clamp 14 in electrical connection with grounding mat 22, while second conductor 24 places the grounding mat in electrical connection with grounding rod 26—which can be driven or screwed into the ground as needed. In this manner, an operator performing repairs or maintenance on pipe 12 can stand on grounding mat 22 with induced current in the pipe being conducted through system 10 to ground at the same potential—namely where the touch potential at the pipe and the step potential on the mat have a difference of zero.

Ground mat 22 can be any electrically conductive material. In the illustrated embodiment, mat 22 is illustrated as a section of commercially available chain link fence.

In the illustrated embodiment, system 10 includes a plurality of grounding mats 22, second conductors 24, and rods 26—as well as a second set of clamp 14, tensioning member 16, and tensioner device 18 operatively connected to pipe 12 and first conductor 20. In this manner, system 10 can provide redundancy to the grounding effects of the induced current.

Referring now to FIGS. 2A through 2F, ground clamp 14 is described in more detail. It has been determined by the present disclosure that it is common for commercial uses of pipe 12 to include insulation and/or protective coatings applied to the exterior of the pipe. Additionally, it has been determined by the present disclosure that commercial uses of pipe 12 can also result in the exterior of the pipe being covered with corrosion, oxidation, or other debris that can reduce the electrical connection between clamp 14 and the pipe.

Advantageously, clamp 14 includes a main body 30, which has a plurality of teeth 32 defined thereon. Teeth 32 are configured to cut through the insulation, protective coating, corrosion, oxidation, and the like on the exterior of pipe 12 as clamp 14 is cinched onto the pipe by tensioner device 18. In some embodiments, teeth 32 are configured to locally deform, scar, or indent pipe 12 to ensure electrical conductivity is made between clamp 14 and the pipe.

Without wishing to be bound by any particular theory, the action of tightening tensioner device 18 is believed to create a back-and-forth or sawing motion in clamp 14 that allows teeth 32 to cut through the materials on the outer surface of pipe 12. In some embodiments, it is contemplated that the user first remove at least some of the debris from pipe 12—at least in the region of clamp 14—to further encourage the electrical connection between the pipe and clamp.

In the illustrated embodiment, main body 30 is configured so that teeth 32 have a diameter that substantially conforms to the outer diameter of pipe 12. As best seen in FIGS. 2D and 2F, teeth 32 are disposed on main body 30 so that a leading edge 34 of the teeth have a predetermined orientation that can be selected from an orientation that faces the leading edge of the teeth away from one another, an orientation that faces the leading edge of the teeth towards one another, an orientation that faces the leading edge of the teeth perpendicular to a radius of pipe 12, and any combinations thereof. In FIG. 2D, teeth 32 are shown on both halves of main body 30 with leading edge 34 facing outward away from one another.

Main body 30 also includes openings 36 that are configured to connect the main body to tensioning member 16 and tensioner device 18, respectively.

Clamp 14 is made of any electrically conductive material having sufficient strength to withstand to forces applied by tensioner device 18. By way of example, clamp 14 can be made of plate or cast metals such as, but not limited to, pure copper, brass, bronze, and any other electrically conductive alloy.

Clamp 14 is configured to be secured to first conductor 20 in any desired matter. In the illustrated embodiment, clamp 14 further includes a terminal plate 38 having a bolt pattern 40, which allows connection of the clamp to—for example known two-hole grounding lugs (not shown) such as those commercially available from Applicant. Preferably, pattern 40 includes four bolt holes configured to allow connection of terminal plate 38 to the aforementioned known two-hole grounding lugs in parallel, at 45 degrees, or at 90 degrees. Of course, it is contemplated by the present disclosure for pattern 40 to have any desired number or bolt holes sufficient to connect plate 38 to a grounding lug. Moreover, it is contemplated by the present disclosure for clamp 14 to have any desired connection system sufficient to electrically connect first conductor 20 to the clamp.

Although teeth 32 are shown in FIG. 2D as serrated teeth with leading edges 34 facing outward away from one another, it is contemplated by the present disclosure for teeth 32 to have any desired orientation. For example, clamp 14 is illustrated having teeth 32 configured as serrated teeth with leading edge 34 on the opposing halves facing inwards towards one another in FIGS. 3A through 3C. Additionally, clamp 14 is illustrated having teeth 32 configured so that leading edge 34 is perpendicular to the outer surface of pipe 12 in FIGS. 4A through 4C.

Figure 4B:
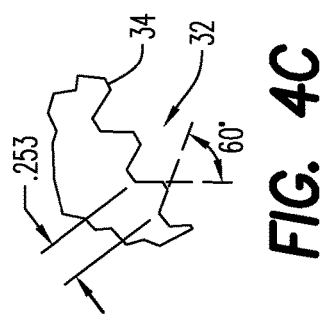
FIG. 4B is an end view of the ground clamp of FIG. 4A.
Figure 4C:
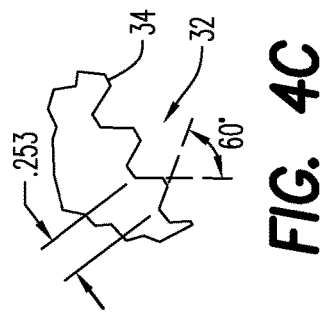
FIG. 4C is a detail view of the ground clamp of FIG. 4A taken at circle C.
Figure 5A:
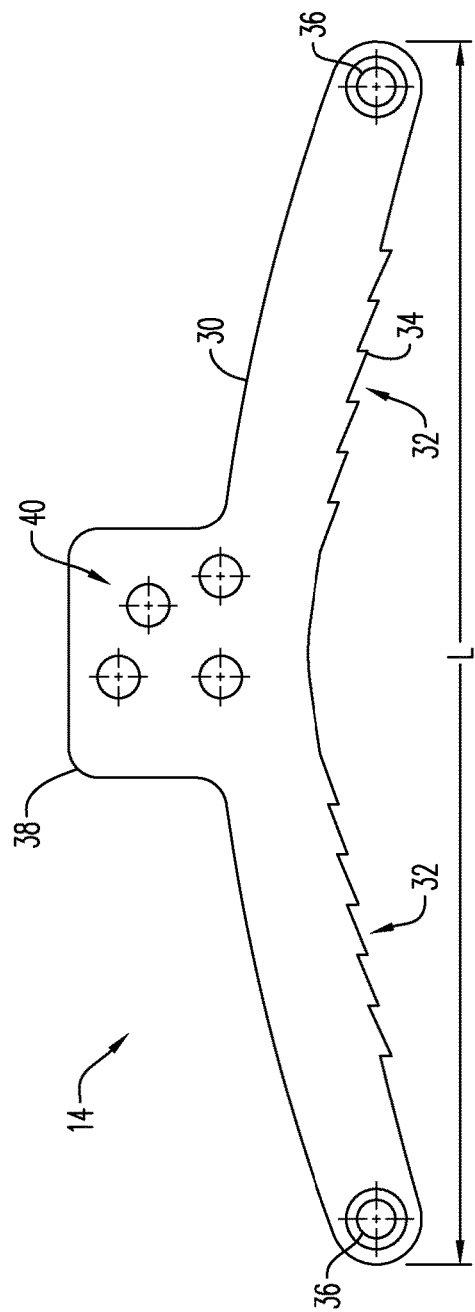
FIG. 5A is a perspective view of another exemplary embodiment of a ground clamp according to the present disclosure.
Figure 5B:
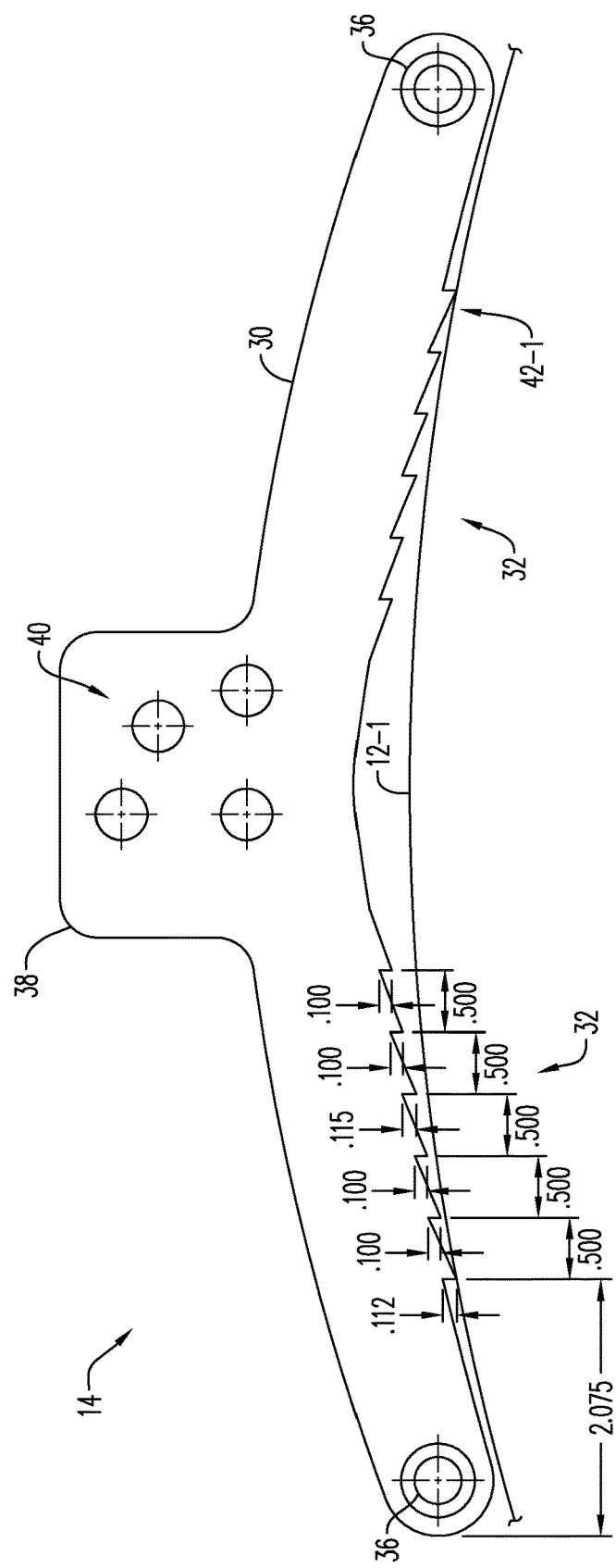
FIG. 5B is another side view of the ground clamp of FIG. 5A in use with a pipe of a first diameter.
Figure 5C:
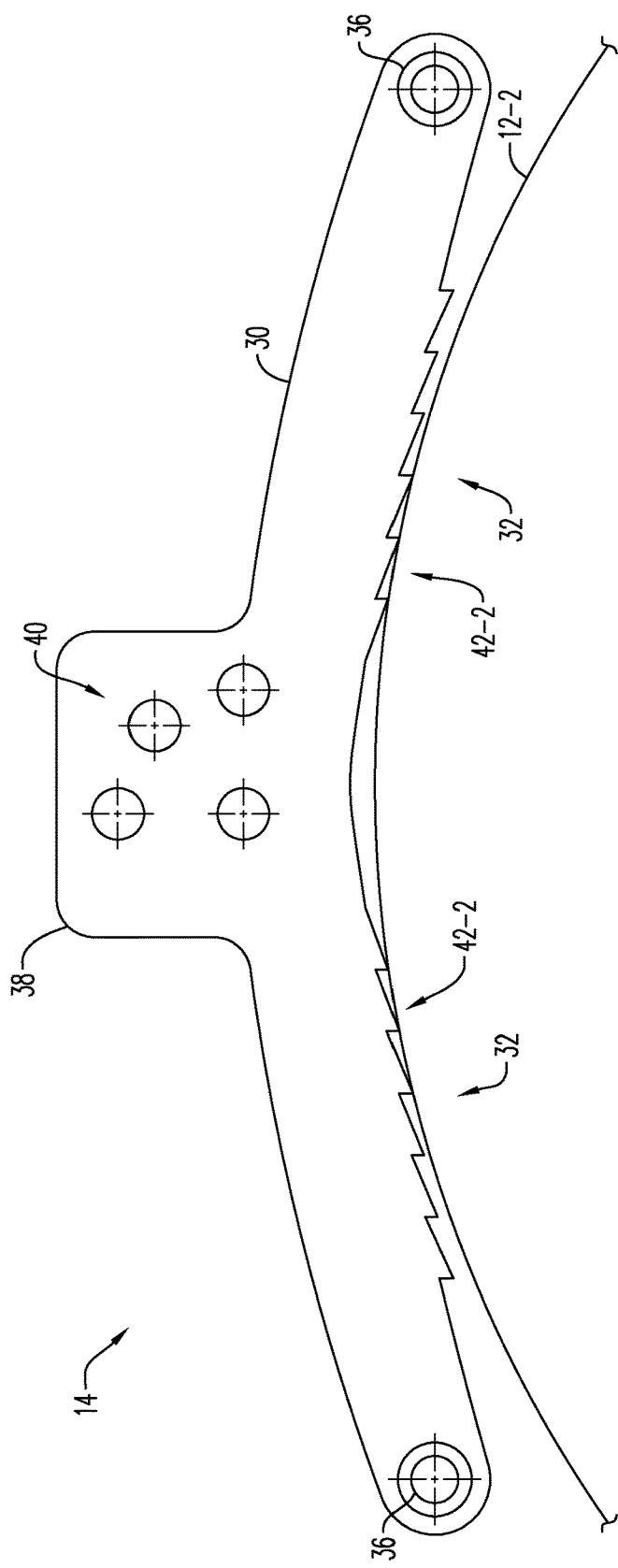
FIG. 5C is a side view of the ground clamp of FIG. 5A in use with a pipe of a second diameter.
Figure 5D:
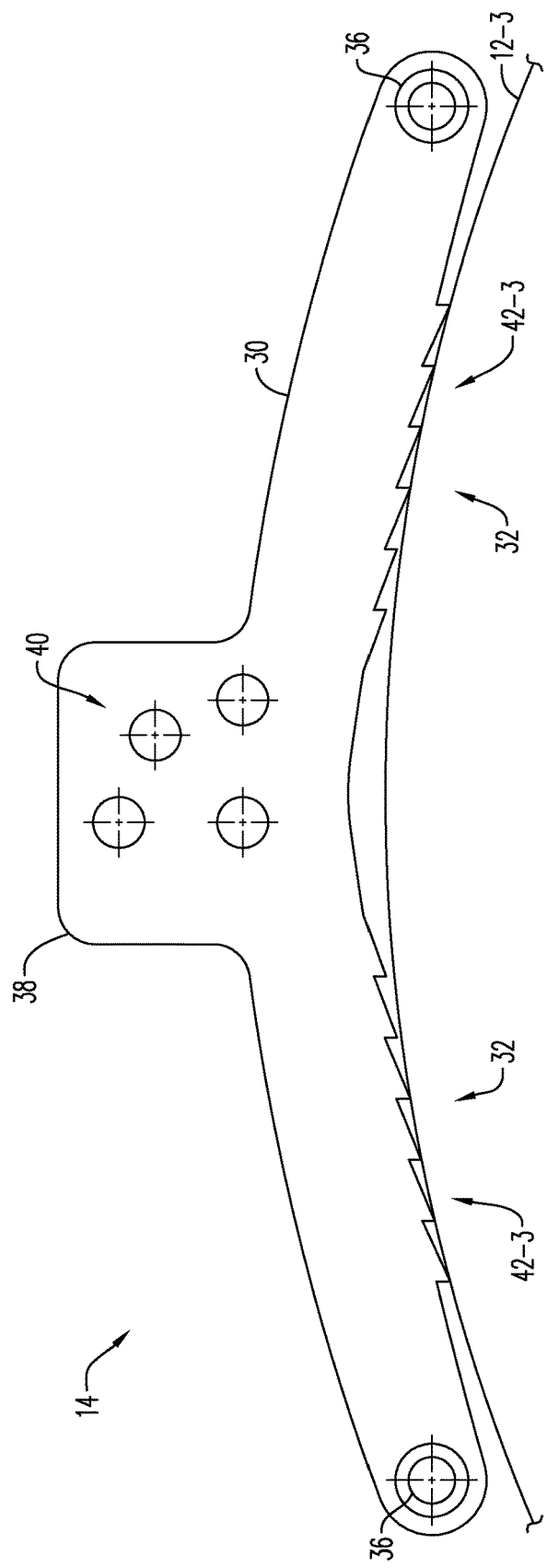
FIG. 5D is a side view of the ground clamp of FIG. 5A in use with a pipe of a third diameter.
Figure 6C:
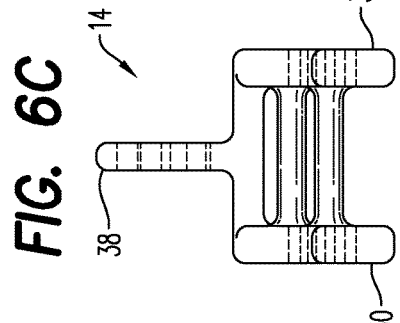
FIG. 6C is an end view of the ground clamp of FIG. 6A.
Figure 6A:
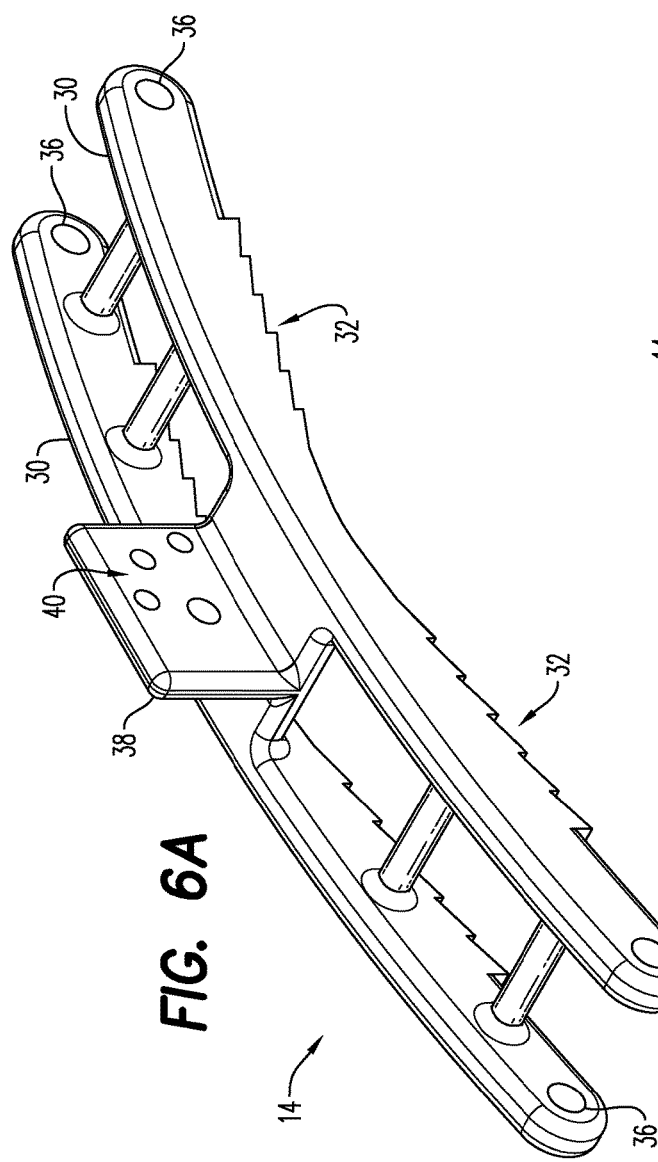
FIG. 6A is a perspective view of another exemplary embodiment of a ground clamp according to the present disclosure.
Figure 6B:
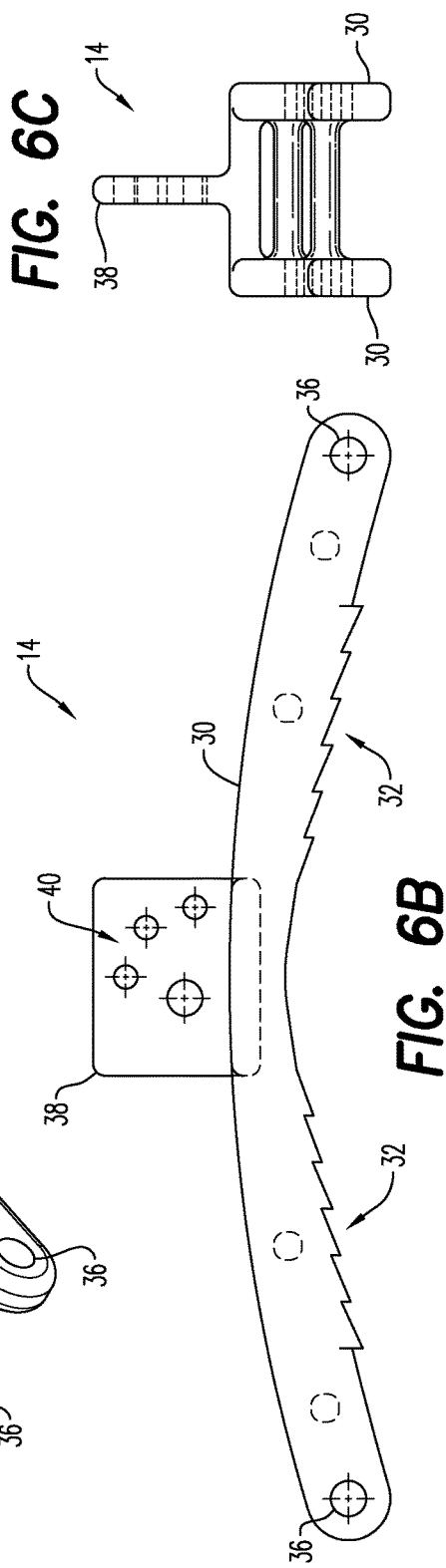
FIG. 6B is a side view of the ground clamp of FIG. 6A.

In the embodiment of FIGS. 3A through 3C, teeth 32 have differing tooth heights, whereas in the embodiment of FIGS. 4A through 4C the teeth have flat apexes. Thus, it is contemplated by the present disclosure for clamp 14 to have teeth of any desired shape (i.e. serrated, flat, and combinations thereof), any desired length, any desired orientation, and any combinations thereof.

It should be recognized that clamp 14 is described by way of example with respect to the embodiments of FIGS. 2A through 4C as configured to form electrical conductivity with pipe 12 of singe outer diameter. In these embodiments, main body 30 and teeth 32 are configured to define a contact surface 42 (best seen in FIGS. 2A and 2B) that has a single diameter, which matches the outer diameter of pipe 12.

Referring now to FIGS. 5A through 5D, clamp 14 is illustrated being configured so as to find use with a number of different pipe diameters, where such configuration is referred to herein as having a "compound radius". Stated another way, clamp 14 is configured to define more than one contact surface 42-1 (FIG. 5B), 42-2 (FIG. 5C), and 42-3 (FIG. 5D), which match the outer diameters of different size pipes 12-1, 12-2, 12-3, respectively.

Clamp 14 is illustrated in FIGS. 5A through 5D having teeth 32 that are on both halves of main body 30 with leading edge 34 facing outward similar to the embodiment illustrated in FIG. 2D and having differing tooth heights as in the embodiment illustrated in FIG. 3A. Of course, it is contemplated by the present disclosure for the compound radius clamp 14 of the present disclosure to provide the plurality of contact surfaces 42-1, 42-2, 42-3 in any desired manner.

Main body 30 is shown in FIGS. 5A through 5D has an overall length (L) of 12.125 inches, providing a compound radius configuration sufficient to find use with pipes having an outer diameter ranging from 10 inches to 20 inches. Of course, it is contemplated by the present disclosure for main body 30 to find use with larger or smaller pipes and/or for the main body have any desired overall length (L) that provides sufficient contact between the main body and the pipe and allows for positioning of tensioner device 18. Accordingly, main body 30 can, in some embodiments, have a ratio of overall length (L) to outer diameter (OD) of pipe 12 ranging from 1:50 to 2:1, with between 1:20 to 1:1 being preferred, with between 1:10 to 1:5 being most preferred.

Referring now to FIGS. 6A through 6G, another embodiment of assembly 10 and clamp 14 are shown. Here, clamp 14 includes two main bodies 30 that are secured to one another. Without wishing to be bound by any particular theory, it is believed that the two bodies 30 each having teeth 32 defined thereon can further ensure that electrical connection is made between clamp 14 and pipe 12.

It should be recognized that clamp 14 is illustrated in this embodiment as creating a single contact surface 42 seen in FIG. 6D. Of course, it is contemplated by the present disclosure for clamp 14 having two bodies 30 to have a compound radius in the manner described above.

Moreover, it should be recognized that clamp 14 is illustrated in this embodiment having teeth 32 on both bodies 30 in the same orientation, namely with leading edge 34 facing outwards away from one another. However, it is contemplated by the present disclosure for clamp the two bodies 30 to have teeth 32 in orientations that differ from one another. It is further contemplated for clamp 14 to have any desired number of bodies—where the bodies have the same or different tooth shapes and/or orientations and/or the same or different number of contact surfaces 42.

It should also be noted that the terms "first", "second", "third", "upper", "lower", "front", "back", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

REFERENCE NUMERALS temporary grounding assembly 10
pipe 12
ground clamp 14
tensioning member 16
tensioner device 18
first conductor 20
grounding mat 22
second conductor 24
grounding rod 26
main body 30
plurality of teeth 32
leading edge 34
openings 36
terminal plate 38
bolt pattern 40
contact surface 42

What is claimed is:

1. A temporary grounding assembly, comprising:
    a ground clamp having a main body with a plurality of teeth that are configured to make electrical connection with an outer diameter of a pipe;
    a tensioning member secured to one end of the ground clamp;
    a tensioner device securable to the tensioning member and to an opposite end of the ground clamp so that the tensioner device is configured to apply tension to the tensioning member and the ground clamp from the one end to the opposite end to constrict the ground clamp onto the pipe;
    a first conductor in electrical connection with the ground clamp; and
    a ground rod in electrical connection with the first conductor.

2. The temporary grounding assembly of claim 1, further comprising a grounding mat and a second conductor, wherein the first electrical conductor is in electrical connection with the ground rod through the grounding mat and the second conductor.

3. The temporary grounding assembly of claim 1, wherein the plurality of teeth define a contact surface that has a diameter that conforms to the outer diameter of a single pipe.

4. The temporary grounding assembly of claim 1, wherein the plurality of teeth define at least two contact surfaces that each match an outer diameter of a different sized pipe.

5. The temporary grounding assembly of claim 1, wherein the plurality of teeth are disposed on the main body so that a leading edge of the teeth have an orientation selected from the group consisting of facing away from one another, facing towards one another, perpendicular to a radius of the pipe, and any combinations thereof.

6. The temporary grounding assembly of claim 1, wherein the main body comprises two halves and the plurality of teeth are disposed on the main body so that the plurality of teeth on each half have a leading edge that faces outward away from one another.

7. The temporary grounding assembly of claim 1, wherein the main body comprises a terminal plate and wherein the first conductor comprises a grounding lug, wherein the grounding lug and terminal plate physically and electrically connecting the main body and first conductor to one another.

8. The temporary grounding assembly of claim 7, wherein the grounding lug is a two-hole lug and the terminal plate has a bolt pattern that is releasably connectable to the two-hole lug in a position selected from the group consisting of parallel, 45 degrees, and 90 degrees.

9. The temporary grounding assembly of claim 1, wherein the tensioning member is selected from the group consisting of a cable, a chain, a strap, a wire, and any combinations thereof.

10. The temporary grounding assembly of claim 1, wherein the main body is made of plate or cast metal selected from the group consisting of pure copper, brass, bronze, and any alloys thereof.

11. The temporary grounding assembly of claim 1, wherein the main body has a ratio of overall length (L) to the outer diameter of the pipe ranging from 1:50 to 2:1.

12. The temporary grounding assembly of claim 1, wherein the ground clamp comprises two main bodies secured to one another.

13. The temporary grounding assembly of claim 12, wherein the two main bodies comprise the plurality of teeth that have a common orientation or a different orientation.

14. The temporary grounding assembly of claim 1, wherein the ground clamp, tensioning member, and tensioner device are selectively connectable to one another in a position around the entire outer diameter of the pipe.

15. A temporary grounding assembly, comprising:
    a ground clamp having a main body with a plurality of teeth that are configured to make electrical connection with an outer diameter of a pipe;
    a tensioning member secured to one end of the ground clamp;
    a tensioner device securable to the tensioning member and to an opposite end of the ground clamp so that the tensioner device is configured to apply tension to the tensioning member and the ground clamp from the one end to the opposite end to constrict the ground clamp onto the pipe;
    a first conductor in electrical connection with the ground clamp; and
    a ground rod in electrical connection with the first conductor, wherein the tensioner device is selected from the group consisting of a manual winch, manual ratchet, motorized winch, and a motorized ratchet.

* * * * *